United States Patent
Avci et al.

(10) Patent No.: US 12,034,493 B2
(45) Date of Patent: Jul. 9, 2024

(54) MISMATCH DETECTION USING PERIODIC STRUCTURES

(71) Applicants: Arizona Board of Regents on behalf of Arizona State University, Scottsdale, AZ (US); Texas Instruments Incorporated, Dallas, TX (US)

(72) Inventors: Muslum Emir Avci, Maricopa, AZ (US); Chethan Kumar Y. B., Bengaluru (IN); Sule Ozev, Phoenix, AZ (US)

(73) Assignees: Arizona Board of Regents on behalf of Arizona State University, Scottsdale, AZ (US); Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/490,644

(22) Filed: Sep. 30, 2021

(65) Prior Publication Data

US 2023/0108249 A1    Apr. 6, 2023

(51) Int. Cl.
*H04B 17/19*     (2015.01)
*H04B 17/00*     (2015.01)
(Continued)

(52) U.S. Cl.
CPC ......... *H04B 17/19* (2015.01); *H04B 17/0085* (2013.01); *H04B 17/104* (2015.01); *H04B 17/13* (2015.01); *H04B 17/14* (2015.01)

(58) Field of Classification Search
CPC .... H04B 17/19; H04B 17/1047; H04B 17/13; H04B 17/14; H04B 17/0085
See application file for complete search history.

(56) References Cited

U.S. PATENT DOCUMENTS

| 4,580,092 A | * | 4/1986 | Squire | ................... G01R 27/04 324/646 |
| 7,911,277 B2 | | 3/2011 | Paul et al. | |

(Continued)

OTHER PUBLICATIONS

Avci, M.E et al., "Design Optimization for N-port RF Network Reflectometers under Noise and Gain Imperfections," 2020 IEEE International Test Conference (ITC), Nov. 1-6, 2020, Washington, DC, USA, IEEE, 10 pages.

(Continued)

*Primary Examiner* — Junpeng Chen
(74) *Attorney, Agent, or Firm* — Withrow & Terranova, P.L.L.C.

(57) ABSTRACT

Mismatch detection using periodic structures is provided. Embodiments described herein can measure and detect mismatch between two loads in a radio frequency (RF) system without the need for external calibration by referencing their measurements into a small set of parameters that are intrinsic to the RF system design. This approach can be used to compare impedances of two loads and measure their impedances relative to each other without requiring any external calibration (e.g., the approach does not assume any prior known physical quantities in the system, such as a reference impedance). This approach can be used to compare the two loads to each other, as well as to quantify the amount of mismatch between these loads by calculating reflection coefficient between the loads. Loads can be passive devices, such as antennas, or they can be active devices, such as amplifiers.

18 Claims, 8 Drawing Sheets

(51) Int. Cl.
    *H04B 17/10*        (2015.01)
    *H04B 17/13*        (2015.01)
    *H04B 17/14*        (2015.01)

(56)            References Cited

U.S. PATENT DOCUMENTS

| | | | |
|---|---|---|---|
| 8,095,085 | B2 | 1/2012 | Song et al. |
| 8,471,756 | B2 | 6/2013 | Grebennikov et al. |
| 9,835,714 | B2 | 12/2017 | Dandu et al. |
| 2004/0214621 | A1* | 10/2004 | Ponce De Leon ..... H01Q 1/242 |
| | | | 455/575.8 |
| 2011/0074388 | A1* | 3/2011 | Bowman ............ H01R 13/6683 |
| | | | 324/76.38 |
| 2011/0148519 | A1* | 6/2011 | Drogi .................. H03G 3/3042 |
| | | | 330/129 |
| 2012/0206304 | A1* | 8/2012 | Clow .................... H04B 17/20 |
| | | | 343/703 |
| 2015/0072632 | A1* | 3/2015 | Pourkhaatoun ......... H03F 3/245 |
| | | | 455/127.2 |
| 2017/0264010 | A1* | 9/2017 | Shi ............................ H04B 1/18 |
| 2018/0248634 | A1* | 8/2018 | Pascolini ............. H04B 17/318 |

OTHER PUBLICATIONS

Bowers, S.M et al., "Integrated Self-Healing for mm-Wave Power Amplifiers," IEEE Transactions on Microwave Theory and Techniques, vol. 61, Issue 3, Feb. 2013, IEEE, pp. 1301-1315.

Caldecott, R et al., "The generalized multiprobe reflectometer and its application to automated transmission line measurements," IEEE Transactions on Antennas and Propagation, vol. 21, Issue 4, Jul. 1973, IEEE, pp. 550-554.

Donahue, D.T et al., "Power Amplifier with Load Impedance Sensing Incorporated into the Output Matching Network," IEEE Transactions on Circuits and Systems I: Regular Papers, vol. 67, Issue 12, Jun. 9, 2020, IEEE, pp. 5113-5124.

Engen, G.F. et al., "An Improved Circuit for Implementing the Six-Port Technique of Microwave Measurements," IEEE Transactions on Microwave Theory and Techniques, vol. 25, Issue 12, Dec. 1977, IEEE, pp. 1080-1083.

Engen, G.F., "The Six-Port Reflectometer: An Alternative Network Analyzer," IEEE Transactions on Microwave Theory and Techniques, vol. MTT-25, No. 12, Dec. 1977, IEEE, pp. 1075-1080.

Erdogan, E. et al., "Detailed Characterization of Transceiver Parameters Through Loop-Back-Based BiST," IEEE Transactions on Very Large Scale Integration (VLSI) Systems, vol. 18, Issue 6, Jul. 2009, IEEE, 11 pages.

Da, I et al., "An Adaptive Impedance Matching System and its Application to Mobile Antennas," 2004 IEEE Region 10 Conference (TENCON 2004), Nov. 24, 2004, Chiang Mai, Thailand, IEEE, pp. 543-546.

Jeong, J.W. et al., "Robust amplitude measurement for RF BIST applications," 2015 20th IEEE European Test Symposium (ETS), May 25-29, 2015, Cluj-Napoca, Romania, IEEE, 6 pages.

Ji, D. et al., "A Novel Load Mismatch Detection and Correction Technique for 3G/4G Load Insensitive Power Amplifier Application," IEEE Transactions on Microwave Theory and Techniques, vol. 63, Issue 5, May 2015, IEEE, pp. 1530-1543.

Kurokawa, K. et al., "Power Waves and the Scattering Matrix," IEEE Transactions on Microwave Theory and Techniques, vol. 13, Issue 2, Mar. 1965, IEEE, 9 pages.

Lu, Y. et al., "A MEMS reconfigurable matching network for a class AB amplifier," IEEE Microwave and Wireless Components Letters, vol. 13, Issue 10, Oct. 2003, IEEE, 3 pages.

Nicolas, D. et al., "A fully-integrated SOI CMOS complex-impedance detector for matching network tuning in LTE power amplifier," 2017 IEEE Radio Frequency Integrated Circuits Symposium (RFIC), Jun. 4-6, 2017, Honolulu, HI, USA, IEEE, 4 pages.

Song, H. et al., "A CMOS adaptive antenna-impedance-tuning IC operating in the 850MHz-to-2GHz band," 2009 EEE International Solid-State Circuits Conference—Digest of Technical Papers, Feb. 2009, IEEE, 3 pages.

Staszewski, R.B. et al., "RF Built-in Self Test of a Wireless Transmitter," IEEE Transactions on Circuits and Systems II: Express Briefs, vol. 54, Issue 2, Feb. 2007, IEEE, 5 pages.

Van Bezooijen, A. et al., "Adaptive Impedance-Matching Techniques for Controlling L Networks," IEEE Transactions on Circuits and Systems I: Regular Papers, vol. 57, Issue 2, Feb. 2010, IEEE, pp. 495-505.

Van Bezooijen, A. et al., "A GSM/EDGE/WCDMA Adaptive Series-LC Matching Network Using RF-MEMS Switches," IEEE Journal of Solid-State Circuits, vol. 43, Issue 10, Oct. 2008, IEEE, pp. 2259-2268.

Yoon, Y. et al., "A 2.4-GHz CMOS Power Amplifier With an Integrated Antenna Impedance Mismatch Correction System," IEEE Journal of Solid-State Circuits, vol. 49, Issue 3, Jan. 2014, IEEE, pp. 608-621.

* cited by examiner

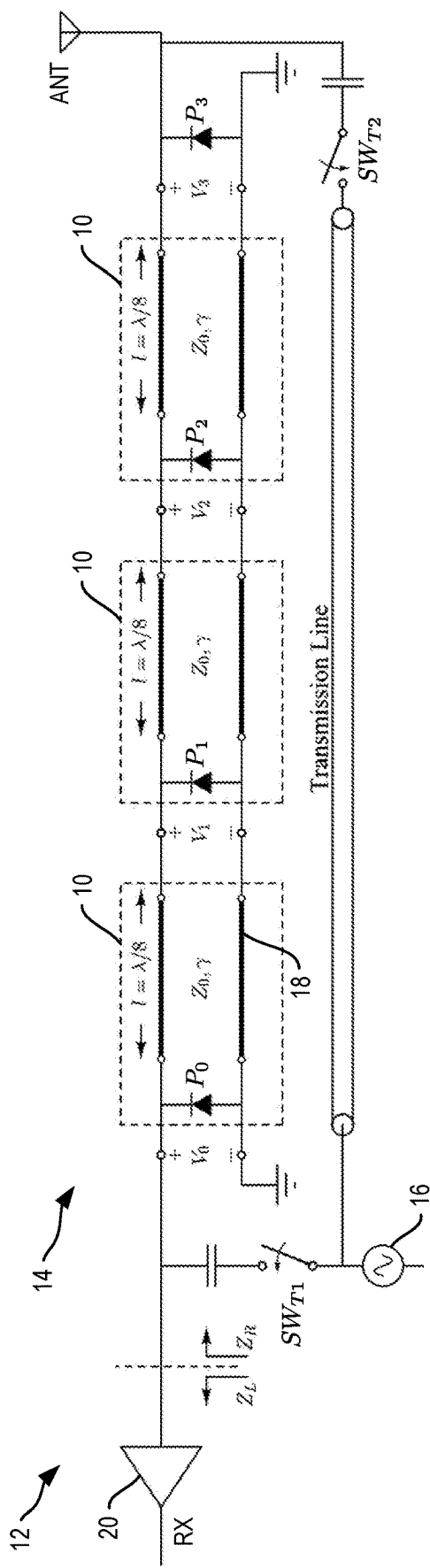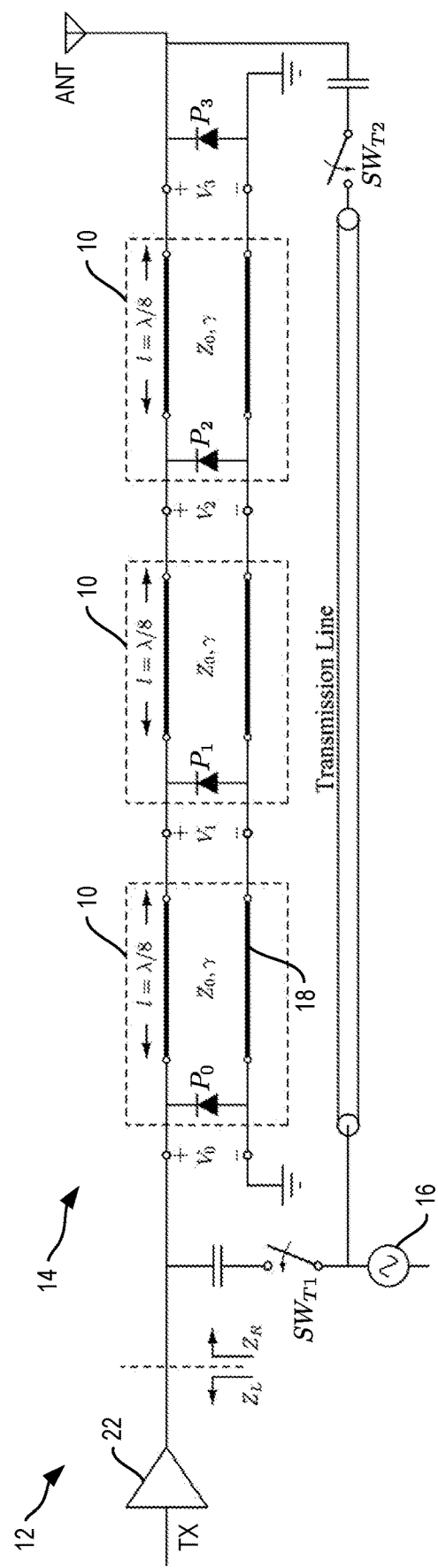
FIG. 7A
FIG. 7B

MISMATCH DETECTION USING PERIODIC STRUCTURES

FIELD OF THE DISCLOSURE

The present disclosure is related to measuring impedance characteristics of radio frequency (RF) systems.

BACKGROUND

The performance and proper operation of radio frequency (RF) systems can be highly dependent on process variations, as well as dynamic and other environmental conditions. With increased use of RF systems in consumer, industrial and mission critical applications, ensuring the proper operation of a given RF system is critical. The proper operation of the RF system against process, voltage, and temperature (PVT) variations can be ensured by using extensive simulation methods and accounting for the variations in the design process. An increasing concern for advanced RF systems is dynamic variations in performance, which cannot be calibrated for during post-production tests. Post-production and in-field monitoring and calibration through built-in self-test (BIST) techniques thus become essential for reliable operation of RF systems.

Such performance monitoring and simulation options become more limited for places where the RF system interfaces with a physical environment. For example, characteristics of an antenna (e.g., input impedance) change depending on surrounding objects and materials in the near-field, antenna array configuration, mutual coupling between antennas, and scan angle of the antennas. These changes in characteristics of an antenna in turn affect the performance of antenna interfacing elements (e.g., power amplifiers, low noise amplifiers). Matching between amplifiers and a load controls the overall gain, noise figure, and linearity of the RF system. Ensuring matching between antenna and amplifiers is critical because return loss should be above a certain value for an antenna to function properly and achieve its design goals. Therefore, one of the most critical parameters for proper operation of these elements is matching between the amplifier and the antenna, which can be quantified by the reflection coefficient between a source (e.g., power amplifier) and a load (e.g., antenna).

The current state of the art for ensuring matching between circuit elements is to use a network analyzer as an external equipment and measure and calibrate circuit nodes to a pre-determined value, such as 50 Ohms. Efforts that extend the network analyzer concept to BIST also rely on the same principles of external calibration. Several shortcomings exist with this approach that significantly hamper its use for advanced RF systems. First, the network analyzer needs to be calibrated externally; any mismatch between the calibration and test conditions results in error. Second, due to the need for external calibration, only circuit nodes that are accessible from chip pinouts can be calibrated, leaving a significant number of nodes that need to be matched for proper operation uncalibrated. Techniques that can be used to measure and monitor mismatch between critical circuit nodes without the need for external calibration can alleviate these problems.

SUMMARY

Mismatch detection using periodic structures is provided. Embodiments described herein can measure and detect mismatch between two loads in a radio frequency (RF) system without the need for external calibration by referencing their measurements into a small set of parameters that are intrinsic to the RF system design. This approach can be used to compare impedances of two loads and measure their impedances relative to each other without requiring any external calibration (e.g., the approach does not assume any prior known physical quantities in the system, such as a reference impedance). This approach can be used to compare the two loads to each other, as well as to quantify the amount of mismatch between these loads by calculating reflection coefficient between the loads. Loads can be passive devices, such as antennas, or they can be active devices, such as amplifiers. The proposed approach can be used for a wide range of RF frequencies from microwave to millimeter wave (mmWave) frequencies.

Embodiments use two different test signal paths to inject a test signal into the RF system. In normal operating mode, these paths are disconnected from the RF system. In measurement mode, measurements are done in two steps. In each step, only one impedance is measured by injecting a test signal through only one path to the system—which impedance is measured depends on where the test signal is injected. Test signal injection results in power detector readings that relate measured impedance to a small set of system parameters. In other words, in each step impedance is mapped into a small set of parameters that does not change between measurements, which facilitates comparing loads and calculating any mismatch between two loads.

An exemplary embodiment provides a method for measuring impedance mismatch in a system. The method includes injecting a first test signal into a forward path through the system and measuring electrical parameters of the system from the first test signal to produce a first set of measurements. The method further includes injecting a second test signal into a reverse path through the system and measuring electrical parameters of the system from the second test signal to produce a second set of measurements. The method further includes calculating an impedance mismatch of the system based on the first set of measurements and the second set of measurements.

Another exemplary embodiment provides a mismatch detector. The mismatch detector includes a first switching element coupled between a signal source and a forward injection node; a second switching element coupled between the signal source and a reverse injection node; a plurality of power detectors coupled between the forward injection node and the reverse injection node; and a processor coupled to the plurality of power detectors. The processor is configured to calculate an impedance mismatch between the forward injection node and the reverse injection node based on measurements of the plurality of power detectors.

Another exemplary embodiment provides a system. The system includes a circuit; and a built-in self-test (BIST) structure coupled to the circuit. The BIST structure is configured to inject a first test signal into a forward path through the circuit; measure electrical parameters of the system from the first test signal to produce a first set of measurements; inject a second test signal into a reverse path through the circuit; measure electrical parameters of the system from the second test signal to produce a second set of measurements; and calculate an impedance mismatch of the system based on the first set of measurements and the second set of measurements.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 7A is a schematic block diagram of an exemplary RF system implementing impedance mismatch detection and measurement according to embodiments described herein.

FIG. 7B is a schematic block diagram of another exemplary RF system implementing impedance mismatch detection and measurement.

DETAILED DESCRIPTION

Figure 1A:
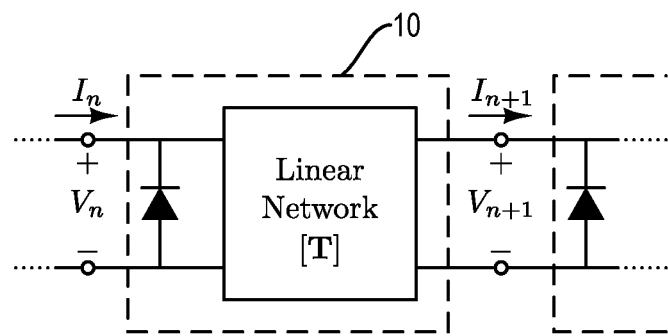
FIG. 1A is a block schematic diagram of a unit cell of a periodic structure used for measuring impedance mismatch in a radio frequency (RF) system according to embodiments described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Mismatch detection using periodic structures is provided. Embodiments described herein can measure and detect mismatch between two loads in a radio frequency (RF) system by referencing their measurements into a small set of parameters that are intrinsic to the RF system design. This approach can be used to compare impedances of two loads and measure their impedances relative to each other without requiring any external calibration (e.g., the approach does not assume any prior known physical quantities in the system, such as a reference impedance). This approach can be used to compare the two loads to each other, as well as to quantify the amount of mismatch between these loads by calculating reflection coefficient between the loads. Loads can be passive devices, such as antennas, or they can be active devices, such as amplifiers.

Embodiments use two different test signal paths to inject a test signal into the RF system. In normal operating mode, these paths are disconnected from the RF system. In measurement mode, measurements are done in two steps. In each step, only one impedance is measured by injecting a test signal through only one path to the system—which impedance is measured depends on where the test signal is injected. Test signal injection results in power detector readings that relate measured impedance to a small set of system parameters. In other words, in each step impedance is mapped into a small set of parameters that does not change between measurements, which facilitates comparing loads and calculating any mismatch between two loads.

I. Introduction

The present disclosure proposes a technique to directly measure the mismatch between a source and a load without the need for external calibration in an RF system. Measurements can then be used as an input to a system that improves performance under mismatch caused by PVT and environmental factors, such as an adaptive/tunable matching network structure or a self-healing method.

A wide range of mismatch detection methods and reflection coefficient measurement designs are used in the current literature both as an input to adaptive structures and for performance monitoring purposes. Because coherent measurement between an incident test signal and a corresponding reflected test signal is not generally possible in small overhead applications, in current literature mismatch information is extracted in two steps. In the first step, a passive network is leveraged to generate more information on how incident and reflected waves are related. This information is then processed and measured using small overhead sensors, such as power detectors. A passive network that generates more information on how a circuit is loaded can consist of directional couplers or a circulator, which enables the measurement of the incident and reflected voltages directly.

Another technique which is very common is insertion of a series element (generally an inductor, but can also be a transmission line), which enables signal measurement since changes of voltage across the element are related to loading of the circuit. More complicated passive network structures that consist of a combination of phase shifters and various couplers are also possible.

Most of the methods in current literature aim to directly measure the impedance amount in known units, such as Ohms, or equivalently may measure a reflection coefficient referenced to a characteristic impedance. This requires the incorporation of a physical unit into the system. This can be achieved by an external calibration with known loads. Unfortunately, external calibration may not be possible on a fabricated board or a chip due to physical constraints, such as inserting various calibration loads on a desired measurement plane. Another way to incorporate unit information into the system is to rely on physical quantities in the RF system, such as by including a known impedance value in the system, which is subject to PVT variations.

Fortunately, incorporation of a unit standard is not necessary for calculating mismatch. Instead, the mismatch metric can be obtained in a manner that is unitless, meaning that by scaling source and load impedance by a common factor the mismatch amount would be the same. Therefore, if the source and load impedance can be measured in relation to each other, the mismatch can be calculated. This is leveraged herein to achieve mismatch measurement without requiring any calibration or known physical parameters in the RF system.

To achieve relative measurement of the impedances in relation to each other, embodiments use a two-step approach to the measurement problem. In each step, only one impedance of interest is measured. A test signal is injected which would generate readings highly correlated to its value. Since in each step only one of the impedances is measured, its value is mapped to a small set of parameters. In other words, impedance values are mapped to a third set of parameters and then using this small set of parameters, the relationship between the two impedances is measured. This third set of parameters arises from the physical structure of a built-in self-test (BIST) system. To keep the number of parameters as small as possible, a repeating structure (e.g., periodic structures such as used in filter and matching designs) can be used such that each measurement provides information on how the structure parameters are related to the impedances of interest.

The relation between structure parameters and impedances of interest can be derived by physical models of the BIST system. Since mismatch measurement is a ratio metric, embodiments can reduce the information requirements from external calibration or known physical quantities to a physical model of the BIST structure and how it is related to the impedances of interest.

A mismatch detector design is presented as an illustrative embodiment of the disclosure. This design includes a number of power detectors (e.g., four) that are placed on a transmission line in regular intervals and two test signal paths. In the measurement mode, test signal paths are connected to the transmission line and a test signal is injected. The power detectors measure the strength of the incident test signal to determine reflection coefficient of the loads referenced to the transmission line. This information is used to calculate any mismatch amount of two loads. An example of the design is implemented on a printed circuit board (PCB) using a coplanar waveguide with ground as a transmission line. Although the proposed technique applies to a wide range of frequencies, in this design example reflection coefficient and mismatch is measured within a band between 3.2 gigahertz (GHz) and 3.7 GHz. It can detect and measure load mismatch down to −20 decibels (dB).

Section II develops the general theoretical background for the proposed BIST design and relates the power measurements to impedance values in terms of network parameters. Section III gives a design example and walks through how a good design can be accomplished using the given theoretical background. This design is based on power detectors placed on a transmission line with equal spacing, similar to slotted line measurement. Section IV develops a solver for solving for relative values of the impedances in terms of power measurements. Section V describes a computer system which may be used to implement embodiments described herein.

II. Methodology

Figure 1B:
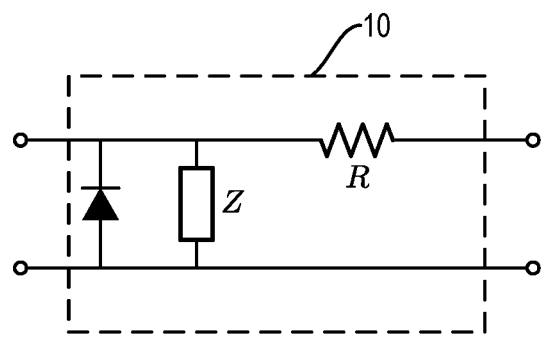
FIG. 1B is an equivalent circuit diagram of the unit cell of FIG. 1A.

FIG. 1A is a block schematic diagram of a unit cell 10 of a periodic structure used for measuring impedance mismatch in an RF system according to embodiments described herein. FIG. 1B is an equivalent circuit diagram of the unit cell 10 of FIG. 1A. The unit cell 10 includes a linear network, which can be characterized as having a series resistance and a parallel impedance across the ports of the unit cell 10. Example linear networks for the unit cell 10 include, but are not limited to, a transmission line or portion thereof, a waveguide or portion thereof, an inductor, and/or a filter. Voltages and currents at the ports of the unit cell are related by a transmission matrix. This relation can be described as:

$$\begin{bmatrix} V_n \\ I_n \end{bmatrix} = \begin{bmatrix} A & B \\ C & D \end{bmatrix} \begin{bmatrix} V_{n+1} \\ I_{n+1} \end{bmatrix} \quad \text{Equation 1}$$

T can be used as a shorthand for the transmission matrix of the unit cell 10.

$$T = \begin{bmatrix} A & B \\ C & D \end{bmatrix} \quad \text{Equation 2}$$

Figure 2A:
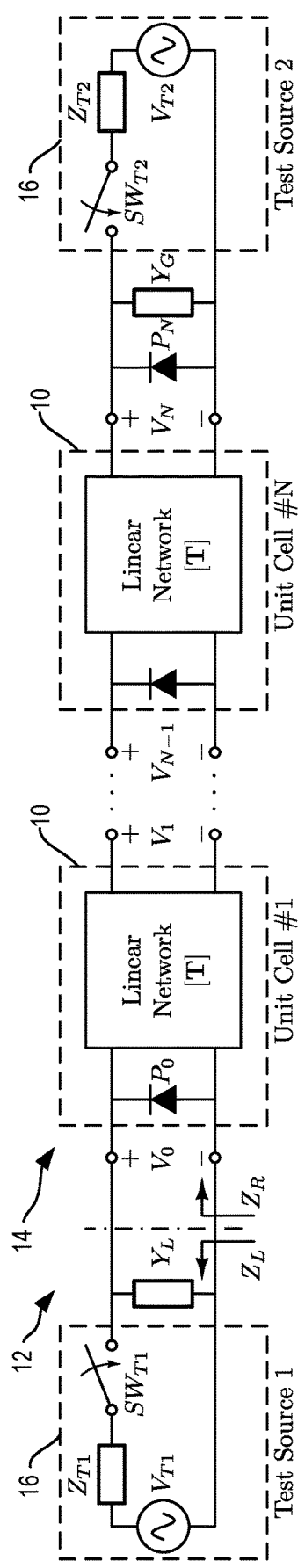
FIG. 2A is a block schematic diagram of an RF system incorporating a built-in self-test (BIST) structure for measuring impedance mismatch according to embodiments described herein.

FIG. 2A is a block schematic diagram of an RF system 12 incorporating a BIST structure 14 for measuring impedance mismatch according to embodiments described herein. The BIST structure 14 includes a power detector $P_0, \ldots, P_N$ at two or more unit cells 10, which can represent a periodic structure in the RF system 12 (such as a transmission line, a waveguide, an array of inductors, an array of filters, etc.). The RF system 12 further includes one or more test sources 16 which inject test signals into the left side and/or right side of the RF system 12. The voltage and current of any port in the periodic structures (e.g., unit cells 10) can be found by using the cascading property of the transmission matrices.

Figure 2B:
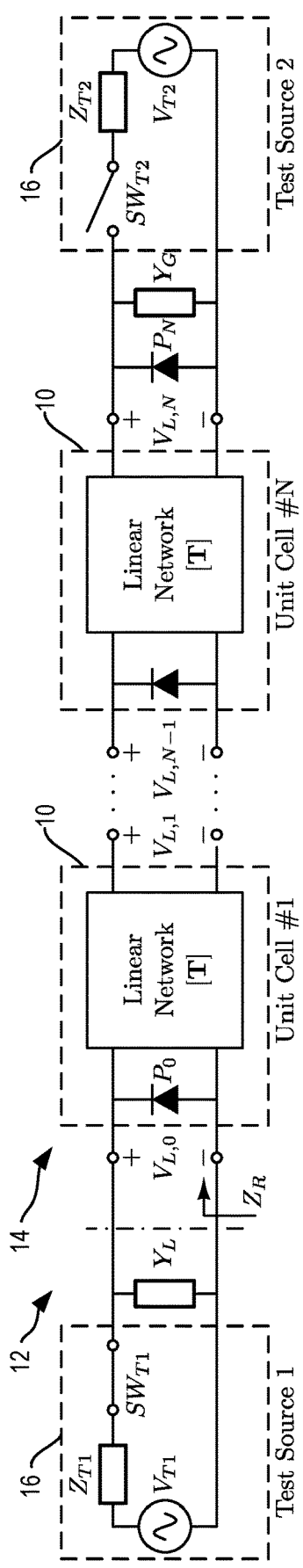
FIG. 2B illustrates a configuration of the RF system of FIG. 2A for measuring right impedance $Z_R$.

FIG. 2B illustrates a configuration of the RF system 12 of FIG. 2A for measuring right impedance $Z_R$. For FIG. 2B, where current flows from left to right, the relation of the transmission matrices can be written as:

$$\begin{bmatrix} V_{R,0} \\ I_{R,0} \end{bmatrix} = T^n \begin{bmatrix} V_{R,n} \\ I_{R,n} \end{bmatrix} \quad \text{Equation 3}$$

The relation between $I_{R,0}$ and $V_{R,0}$ can be expressed in terms of the quantity to be measured $Y_R = Z_R^{-1}$ as:

$$I_{R,0} = V_{R,0} Y_R \quad \text{Equation 4}$$

$V_{R,n}$ and $I_{R,n}$, can be expressed in terms of $V_{R,n}$, and $Y_R$ by multiplying both sides of Equation 3 by $T^{-n}$ and $1/V_{R,0}$ and using Equation 4 as:

$$\begin{bmatrix} V_{R,n}/V_{R,0} \\ I_{R,n}/V_{R,0} \end{bmatrix} = T^{-n} \begin{bmatrix} 1 \\ Y_R \end{bmatrix} \quad \text{Equation 5}$$

Since quantities that are normalized by $V_{R,0}$ will appear many times in the analysis, $\tilde{V}_{R,n}$ is defined as $V_{R,n}$ normalized by $V_{R,0}$ and similarly $\tilde{I}_{R,n}$ represents $I_{R,n}$, normalized by $V_{R,0}$. Using this new notation, Equation 5 can be written more concisely as:

$$\begin{bmatrix} \tilde{V}_{R,n} \\ \tilde{I}_{R,n} \end{bmatrix} = T^{-n} \begin{bmatrix} 1 \\ Y_R \end{bmatrix} \quad \text{Equation 6}$$

This relation assumes current is flowing from left to right, i.e., test signal is injected from the left to measure $Y_R = Z_R^{-1}$.

Figure 2C:
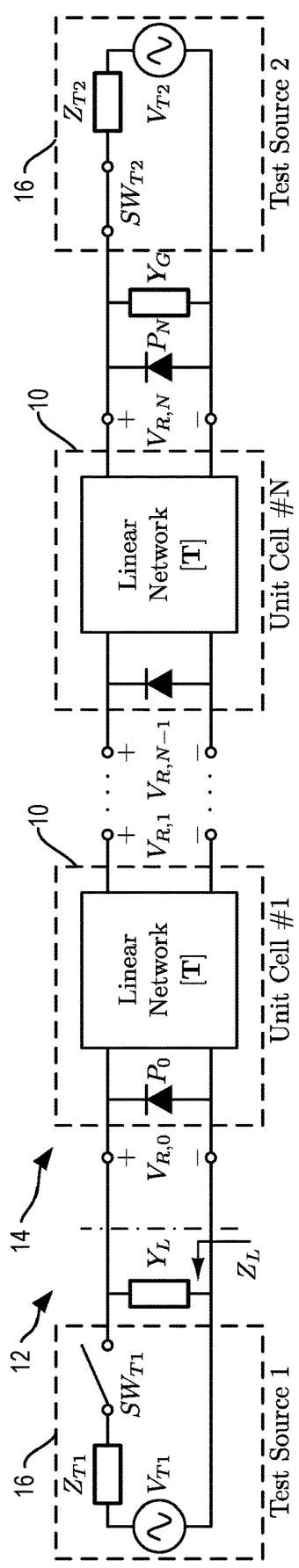
FIG. 2C illustrates a configuration of the RF system of FIG. 2A for measuring left impedance $Z_L$.

FIG. 2C illustrates a configuration of the RF system 12 of FIG. 2A for measuring left impedance $Z_L$. The relation for when a test signal is injected from the right can be found to measure $Y_L = Z_L^{-1}$. First, the transmission matrix for the unit cell 10 when current is flowing from right to left is defined as:

$$T_b = \begin{bmatrix} D & B \\ C & A \end{bmatrix} \quad \text{Equation 7}$$

This expression is arrived at by assuming the unit cell 10 is linear and reciprocal, therefore swapping A and D in Equation 2 is sufficient to find $T_b$. This assumption does not introduce any additional unknowns to the overall system of equations. Using $T_b$ and the cascading property of the transmission matrices, voltages and currents at any port of FIG. 2C can be written as:

$$\begin{bmatrix} \tilde{V}_{L,n} \\ \tilde{I}_{L,n} \end{bmatrix} = T_b^n \begin{bmatrix} 1 \\ Y_L \end{bmatrix} \quad \text{Equation 8}$$

where $\tilde{V}_{L,n}$ and $\tilde{I}_{L,n}$ are defined as $V_{L,n}$ and $I_{L,n}$ normalized by $V_{L,0}$ as before. For simplicity of the analysis, it is assumed that the power detector does not load the ports as loading effects of the power detector can be absorbed into the transmission matrix and its effects can be estimated after the transmission matrix is calculated.

If $V_{L,0}, V_{L,1}, \ldots, V_{L,N}$ and $V_{R,0}, V_{R,1}, \ldots, V_{R,N}$ could be measured coherently (i.e., with magnitude and phase information), Equations 6 and 8 could be used directly to find $Y_L = Z_L^{-1}$ and $Y_R = Z_R^{-1}$ respectively. The amount of mismatch could then be calculated by using Equation 9:

$$\Gamma = \frac{Z_L - Z_S^*}{Z_L + Z_S^*} \quad \text{Equation 9}$$

Unfortunately, such a measurement would introduce significant hardware overhead for a BIST application. To reduce overhead for the BIST, power detectors are used as measurement devices, which can only measure the magnitude of the powers and voltages at the ports. Therefore, only $|V_{L,0}|, |V_{L,1}|, \ldots, |V_{L,N}|$ and $|V_{R,0}|, |V_{R,1}|, \ldots, |V_{R,N}|$ can be measured. Each voltage magnitude is measured by a corresponding power detector (e.g., $|V_{L,n}|$ and $|V_{R,n}|$ measured by $P_n$). Because only the magnitudes of the voltages are known, there is no analytical way to solve a set of equations directly. Accordingly, embodiments use a non-linear solver to solve for the parameters (described further in the next section).

For the most general case, where there is no underlying model for the unit cell 10, two equations are needed for each of the six complex variables (A, B, C, D, $Y_R$, $Y_L$) since the phase information is lost. Overall, at least 12 linearly independent equations are needed to solve for the parameters. The number of required equations can be decreased substantially by using an underlying model for the unit cell 10 by taking account of its structure. There is a limit to the amount of information that can be extracted this way.

Since there is no calibration and current is not measured directly, only the unitless variables can be found. In other words, $Y_R$ and $Y_L$ cannot be directly calculated; instead, $KY_R$ and $KY_L$ are calculated, where K is a complex constant such that it would make overall expression unitless. The actual mismatch can still be found by using this unitless variable by virtue of the mismatch equation itself being a unitless equation. Thus, units of the impedances are not important. If the mismatch equation (Equation 9) is inspected, it is observed that if the impedances are scaled with the same real constant, it will cancel out. To make concepts discussed in this section clearer, an example unit cell and the relation between coherent voltages, impedances, and mismatch are discussed in the next section.

Figure 3:
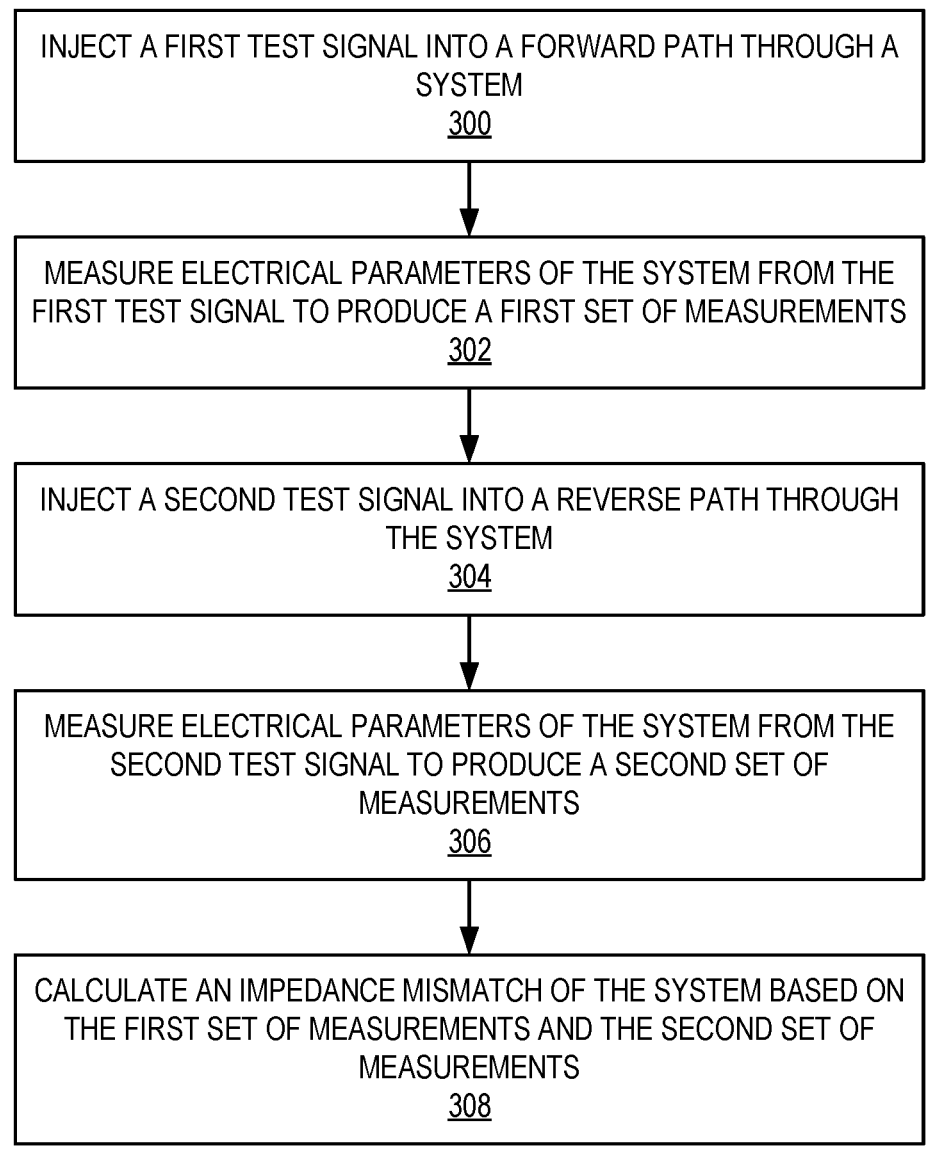
FIG. 3 is a flow diagram illustrating a process for measuring impedance mismatch according to embodiments described herein.

FIG. 3 is a flow diagram illustrating a process for measuring impedance mismatch according to embodiments described herein. The process begins at operation 300, with injecting a first test signal into a forward path through a system. The process continues at operation 302, with measuring electrical parameters of the system from the first test signal to produce a first set of measurements. The process continues at operation 304, with injecting a second test signal into a reverse path through the system. The process continues at operation 306, with measuring electrical parameters of the system from the second test signal to produce a second set of measurements. The process continues at operation 308, with calculating an impedance mismatch of the system based on the first set of measurements and the second set of measurements.

Figure 4:
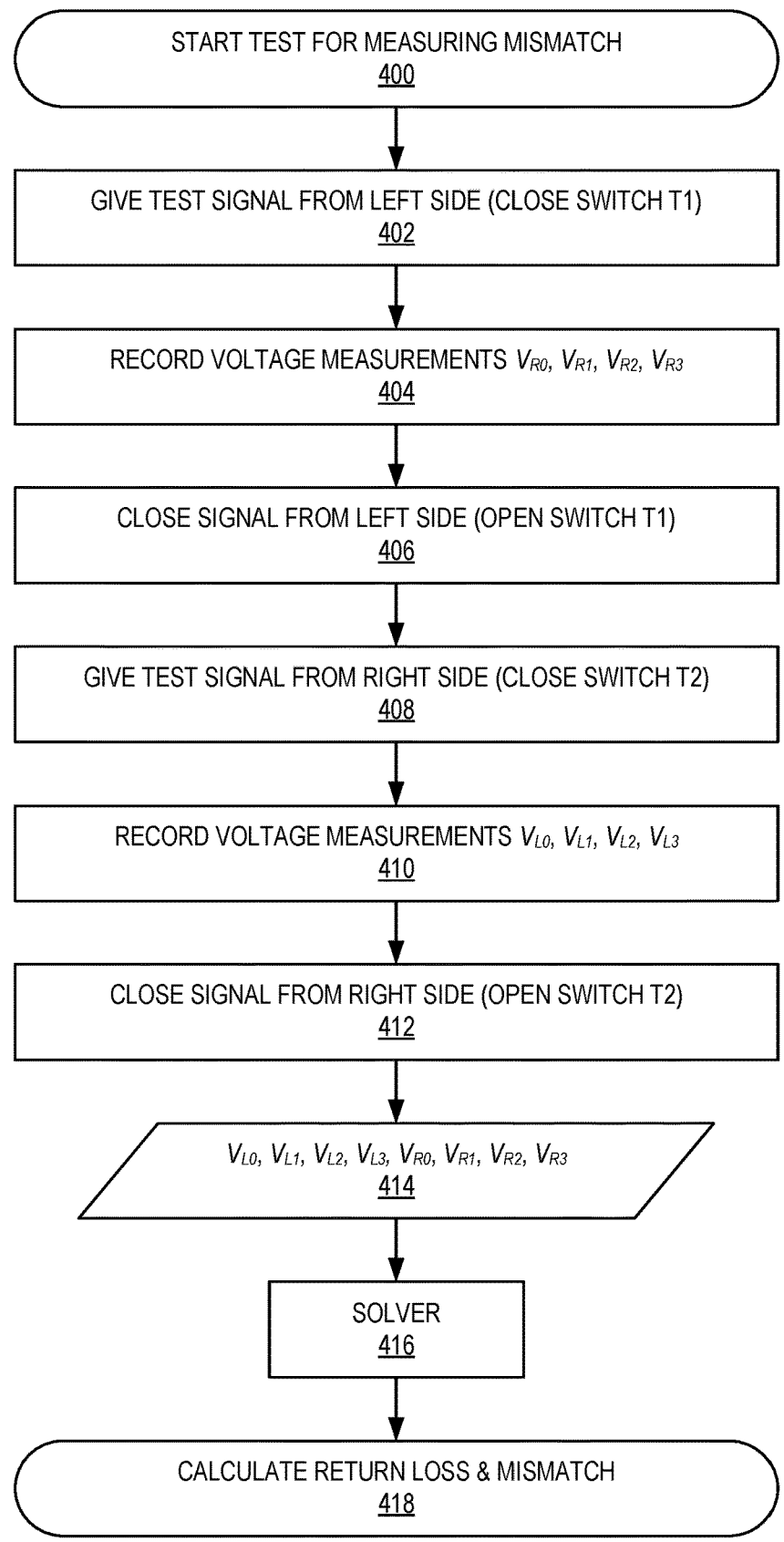
FIG. 4 is a flow diagram illustrating a more detailed example process for BIST operation.

FIG. 4 is a flow diagram illustrating a more detailed example process for the BIST operation described above. The process begins at operation 400, with starting a test for measuring mismatch in an RF system 12. In an exemplary aspect, switches T1 and T2 are open, as illustrated in FIG. 2A. The process continues at operation 402, with giving a test signal from a left side of the RF system 12. In an exemplary aspect, switch T1 is closed, as illustrated in FIG. 2B. The process continues at operation 404, with recording voltage measurements $V_{R,0}$, $V_{R,1}$, $V_{R,2}$, $V_{R,3}$. The process continues at operation 406, with closing the signal from the left side of the RF system 12. In an exemplary aspect, switch T1 is opened, as illustrated in FIG. 2C.

The process continues at operation 408, with giving a test signal from a right side of the RF system 12. In an exemplary aspect, switch T2 is closed, as illustrated in FIG. 2C. The process continues at operation 410, with recording voltage measurements $V_{L,0}$, $V_{L,1}$, $V_{L,2}$, $V_{L,3}$. The process continues at operation 412, with closing the signal from the right side of the RF system 12. In an exemplary aspect, switch T2 is opened, as illustrated in FIG. 2A.

The process continues at operation 414, with outputting voltage measurements $V_{L,0}$, $V_{L,1}$, $V_{L,2}$, $V_{L,3}$, $V_{R,0}$, $V_{R,1}$, $V_{R,2}$, $V_{R,3}$. The voltage measurements are output to a solver at operation 416. The solver may be a non-linear solver which solves for the parameters in the equations above, and is further described in the next section. The process concludes at operation 418, with calculating return loss of the RF system 12 and mismatch between the loads.

Although the operations of FIGS. 3 and 4 are illustrated in a series, this is for illustrative purposes and the operations are not necessarily order dependent. Some operations may be performed in a different order than that presented. Further, processes within the scope of this disclosure may include fewer or more steps than those illustrated in FIGS. 3 and 4.

III. Design Example

This section describes a detailed design example that uses a transmission line and power detectors as the BIST structure 14 (e.g., where a unit cell 10 includes a section of the transmission line and a power detector) and also takes account of the power detector loading. Without any underlying model, embodiments need to solve for 8 unknowns for the ABCD matrix and 4 unknowns for the impedances. By using an underlying model based on the physical structure of the design, the number of unknowns is decreased.

Figure 5:
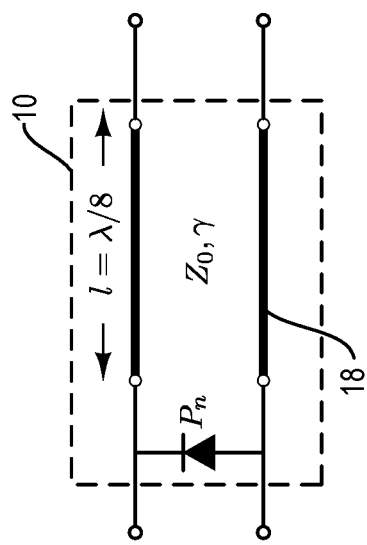
FIG. 5 is a schematic block diagram of an exemplary unit cell design for the RF system implemented with a transmission line and power detector.

FIG. 5 is a schematic block diagram of an exemplary unit cell 10 design for the RF system 12 implemented with a transmission line 18 and power detector $P_n$. This unit cell 10 is modeled by using transmission parameters for shunt load to model the power detector and lossy transmission line parameters to model the transmission line. By multiplying these models, the overall model of the cell T can be found.

Let $\gamma$ be the propagation constant, l be the length of the transmission line, and $Y_D$ be the admittance of the detector. Then the transmission matrix of the unit cell T can be written as:

$$T = \begin{bmatrix} 1 & 0 \\ Y_D & 1 \end{bmatrix} \begin{bmatrix} \cosh(\gamma l) & Z_0 \sinh(\gamma l) \\ \sinh(\gamma l)/Z_0 & \cosh(\gamma l) \end{bmatrix} \quad \text{Equation 10}$$

Figure 6:
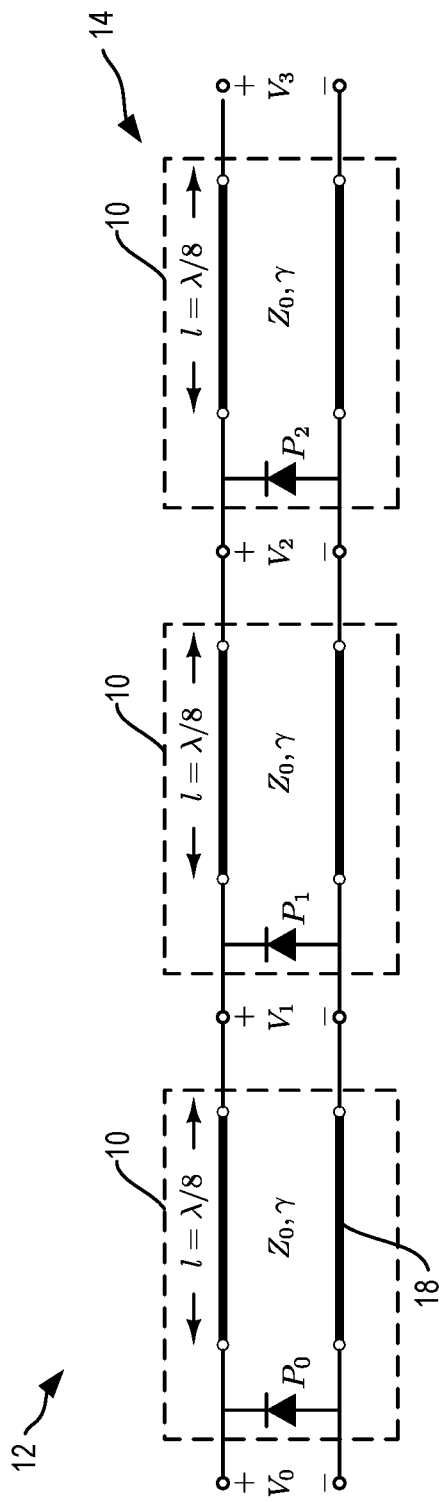
FIG. 6 is a schematic block diagram of an exemplary BIST structure design for the RF system implemented with a transmission line and power detectors placed at intervals along the transmission line.

FIG. 6 is a schematic block diagram of an exemplary BIST structure 14 design for the RF system 12 implemented with a transmission line 18 and power detectors $P_0, \ldots, P_N$ placed at intervals along the transmission line 18. In the depicted example, power detectors measure voltages at $\lambda/8$ intervals (e.g., within a 20% tolerance) of the transmission line 18, though other designs may be implemented differently.

Using Equations 6 and 8, one can write the voltage ratios at each measurement point and solve for $Y_1$, $Y_2$, and $Y_D$. To determine some design goals and possible extensions to the architecture, $Y_1$, $Y_2$, and $Y_D$ are written in terms of complex voltages $\tilde{V}_{R,1}=V_{R,1}/V_{R,0}$, $\tilde{V}_{R,2}=V_{R,2}/V_{R,0}$, $\tilde{V}_{L,0}=V_{L,1}/V_{L,0}$. This also leads to an approach for formulating a solver to find return loss given voltage magnitude measurements.

$$Y_R Z_0 \sinh(\gamma l) = -\tilde{V}_{R,1} + \frac{\tilde{V}_{R,2}}{\tilde{V}_{R,1}} + \frac{1}{\tilde{V}_{R,1}} - \cosh(\gamma l) \quad \text{Equation 11}$$

$$Y_L Z_0 \sinh(\gamma l) = \tilde{V}_{L,1} - \frac{\tilde{V}_{R,2}}{\tilde{V}_{R,1}} - \frac{1}{\tilde{V}_{R,1}} + \cosh(\gamma l) \quad \text{Equation 12}$$

$$Y_D Z_0 \sinh(\gamma l) = \frac{\tilde{V}_{R,2}}{\tilde{V}_{R,1}} + \frac{1}{\tilde{V}_{R,1}} - 2\cosh(\gamma l) \quad \text{Equation 13}$$

As can be seen in Equations 11, 12, and 13, embodiments need to solve for cos h($\gamma$l) to find $Y_R Z_0$ and $Y_L Z_0$. After $Y_R Z_0$ and $Y_L Z_0$ are found, the impedance mismatch can be calculated using Equation 9. Since $Z_0$ terms will cancel each other in the mismatch formula, calculating $Z_0$ is unnecessary. There are two strategies that can be employed for solving for cos h($\gamma$l). First, embodiments can add a section to the BIST structure 14 that has a different transmission line length (such as a 2l transmission line with power detector), which would yield enough knowns to solve for cos h($\gamma$l). Alternatively, embodiments can use high impedance power detectors so that $Y_D \approx 0$ and Equation 13 can be used to solve for cos h($\gamma$l). The example implementation uses the latter approach to decrease the number of power detectors, but one can employ the former to increase the accuracy of the system.

IV. Solver

In previous work, authors generally used non-linear solvers to directly solve for parameters of interest, such as F for six-port network analyzers. Embodiments described herein use a non-linear solver algorithm to solve for phases of complex voltage ratios $\tilde{V}_{R,1}=V_{R,1}/V_{R,0}$, $\tilde{V}_{R,2}=V_{R,2}/V_{R,0}$, $\tilde{V}_{L,0}=V_{L,1}/V_{L,0}$. Then Equations 11, 12, and 13 are used to solve for parameters of interest $Y_L$, $Y_R$, and $\cos h(\gamma l)$. This technique has the advantage of utilizing known magnitudes of the voltages to converge a solution faster than prior approaches. In contrast to solvers in previous works, the solver used in embodiments of the present disclosure does not rely on the gradient of the error surface. It is found herein that, for this structure, a solver that searches a solution space with the theoretical background described above converges on an answer more reliably and in fewer iterations.

An exemplary embodiment produces six measurements in total: three measurements are produced when measuring for $Y_L$, and three measurements are produced when measuring for $Y_R$. Three of these equations are used for parameterizing $Y_L$, $Y_R$, and $Y_D$. Another three equations are used to solve for phases of the complex voltage ratios $\tilde{V}_{R,1}=V_{R,1}/V_{R,0}$, $\tilde{V}_{R,2}=V_{R,2}/V_{R,0}$, $\tilde{V}_{L,0}=V_{L,1}/V_{L,0}$. Writing these equations in terms of the voltage ratios yields:

$$\tilde{V}_{R,3} = -\tilde{V}_{R,1} + \frac{\tilde{V}_{R,2}^2 + \tilde{V}_{R,2}}{\tilde{V}_{R,1}} \quad \text{Equation 14}$$

$$\tilde{V}_{L,2} = \frac{\tilde{V}_{L,1}\tilde{V}_{R,2} + \tilde{V}_{L,1}}{\tilde{V}_{R,1}} - 1 \quad \text{Equation 15}$$

$$\tilde{V}_{L,3} = -\tilde{V}_{R,1} + \frac{\tilde{V}_{L,1}\tilde{V}_{R,2}^2 + 2\tilde{V}_{L,1}\tilde{V}_{R,2} + \tilde{V}_{L,1}}{\tilde{V}_{R,1}^2} - \frac{\tilde{V}_{R,2}+1}{\tilde{V}_{R,1}} \quad \text{Equation 16}$$

An error function can be constructed using Equations 14, 15, and 16 to calculate phases of the voltage ratios. A non-linear solver is used for minimizing this error for different phase values. This approach has several limitations: first, the error surface defined by Equations 14, 15, and 16 has several local minimums; and second, there are regions in the error surface where a solution is not feasible due to triangle inequality. To solve these problems, Equations 14 and 15 are reformulated such that embodiments would only need to sweep an angle of one of the variables.

$$\left|\frac{\tilde{V}_{R,3}}{\tilde{V}_{R,1}}\right| = \left|1 - \frac{1}{\tilde{V}_{R,2}^2}\left(\tilde{V}_{R,2}^2 + \tilde{V}_{R,2}\right)\right| \quad \text{Equation 17}$$

$$|\tilde{V}_{L,2}| = \left|1 - \tilde{V}_{L,1}\frac{\tilde{V}_{R,2}+1}{\tilde{V}_{R,1}}\right| \quad \text{Equation 18}$$

$$A = |1-z| \Rightarrow \begin{array}{l} \text{Re}(z) = (1 - |z|^2 - A^2)/2 \\ \text{Im}(z) = \pm\sqrt{|z|^2 - \text{Re}(z)^2} \end{array} \quad \text{Equation 19}$$

Equations 14 and 15 are reformulated as Equations 17 and 18, respectively, to make everything a function of $\angle\tilde{V}_{R,2}$. Given magnitude and phase of $\tilde{V}_{R,2}$, the four possible solutions for $\tilde{V}_{R,1}$ can be found by using Equations 17 and 19. Similarly given $\tilde{V}_{R,1}$, $\tilde{V}_{R,2}$, the two possible solutions for $\tilde{V}_{L,1}$ can be found. Then these possible solutions are eliminated by substituting them in Equation 16 to see whether a possible solution is close to the actual measurements. These solutions are further filtered by placing constraints on the possible solutions (e.g., if a particular solution yields an impedance that has a negative real part that solution is eliminated).

```
Algorithm 1: Simplified Solver Algorithm

Input   : Measurement list |V_{R,i}|, |V_{L,i}| for i = 1, 2, 3
Output: Mismatch.
1   min_diff ← ∞
2   for a ← 0 to 2π do
3   |   Ṽ_{R,2} ← |Ṽ_{R,2}|e^{ja}
4   |   Ṽ_{R,1}², Ṽ_{R,1}*² ← solve for Ṽ_{R,1}², Ṽ_{R,1}*² using (17), (19)
5   |   for Ṽ_{R,1} ← [Ṽ_{R,1}, -Ṽ_{R,1}, Ṽ_{R,1}*, -Ṽ_{R,1}*] do
6   |   |   Ṽ_{L,1}, Ṽ_{L,1}* ← solve for Ṽ_{L,1}, Ṽ_{L,1}* by (18), (19)
    |   |   for Ṽ_{L,1} ← [Ṽ_{L,1}, Ṽ_{L,1}*] do
7   |   |   |   x ← substitute values in (16)
8   |   |   |   diff ← ||Ṽ_{L,3}| - |x||
9   |   |   |   valid_solution ← check_solution(Ṽ_1, Ṽ_2, V_1')
10  |   |   |   if diff < min_diff and valid_solution then
11  |   |   |   |   min_diff ← diff
12  |   |   |   |   
                  |V̂_{R,1}, V̂_{R,2}, V̂_{L,1}| ← Ṽ_{R,1}, Ṽ_{R,2}, Ṽ_{L,1}
13  |   |   |   end if
14  |   |   end for
15  |   end for
16  end for
17      Z_R, Z_L ← given V̂_{R,1}, V̂_{R,2}, V̂_{L,1} find values from (11)
               - (13) by setting Y_D = 0
18      Mismatch = (Z_R - Z_L*)/(Z_R + Z_L*)
19      return Mismatch
```

FIG. 7A is a schematic block diagram of an exemplary RF system 12 implementing impedance mismatch detection and measurement according to embodiments described herein. In this regard, the RF system 12 includes a transmission line-based BIST structure 14 with power detectors $P_0, \ldots, P_N$ placed at intervals along the transmission line 18 similar to FIG. 6.

In the illustrated embodiment, the transmission line 18 is coupled between an antenna port ANT and a receive port RX (which may couple to a low noise amplifier (LNA) 20 and additional signal conditioning circuitry) of an RF front end. In other embodiments, the BIST structure 14 may be part of another component of the RF system 12, such as within amplifier or control circuitry.

The RF system 12 further includes one or more test sources 16. For example, the test source 16 may be a single signal generator switchably connected to each end of the transmission line 18. For example, the test signal may be generated by transmit circuitry at a transmit port TX, such that the test source 16 may represent a power amplifier (PA). To measure the impedance mismatch, the switches T1 and T2 are alternatively closed, and measurements are taken at the power detectors. A processor (e.g., a digital signal processor (DSP) or hardware accelerator, such as a field-programmable gate array (FPGA)) or other logical circuitry (not shown) then uses these measurements to solve for the impedance mismatch as described above.

FIG. 7B is a schematic block diagram of another exemplary RF system implementing impedance mismatch detection and measurement. In this embodiment, the BIST structure 14 is coupled between a transmit port TX (which may couple to a power amplifier (PA) 22 and additional signal conditioning circuitry) of an RF front end.

Figure 7C:
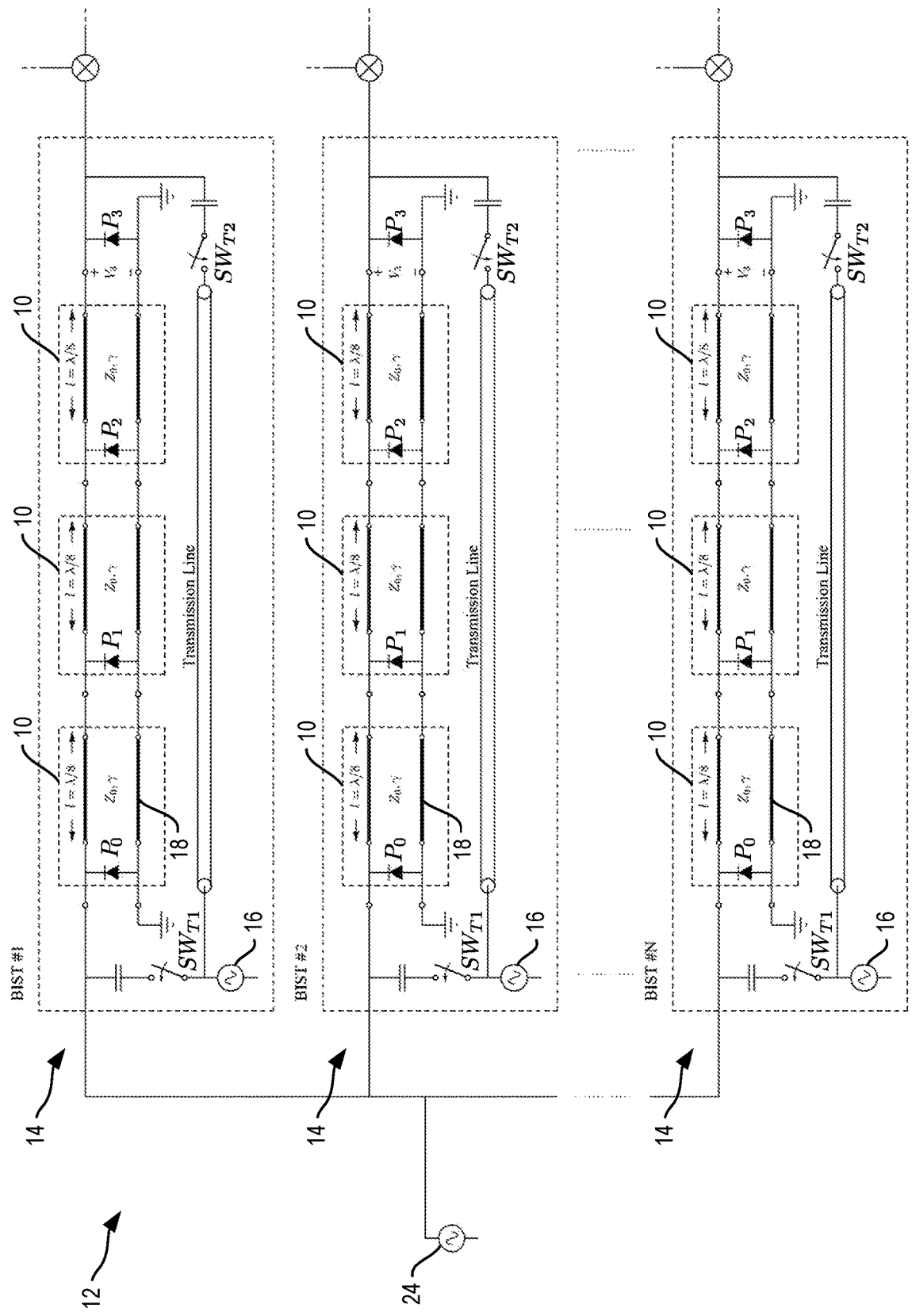
FIG. 7C is a schematic block diagram of another exemplary RF system implementing impedance mismatch detection and measurement.

FIG. 7C is a schematic block diagram of another exemplary RF system implementing impedance mismatch detection and measurement. In this embodiment, the BIST structure 14 is between N nodes of local oscillator 24 signals that are distributed throughout the device for a multi-antenna system. The N nodes need to be matched, so the BIST structure 14 is deployed at each of these nodes.

Embodiments described herein provide a mismatch detector for the RF system 12 which does not require a circulator or directional coupler. The mismatch detector can be coupled to any circuit in the RF system 12. Applications include, but are not limited to, a millimeter wave (mmWave) or higher frequency RF circuit. Mismatch detectors according to this disclosure may be implemented as a system on chip (SoC), in software, or with general purpose or specialized components.

V. Computer System

Figure 8:
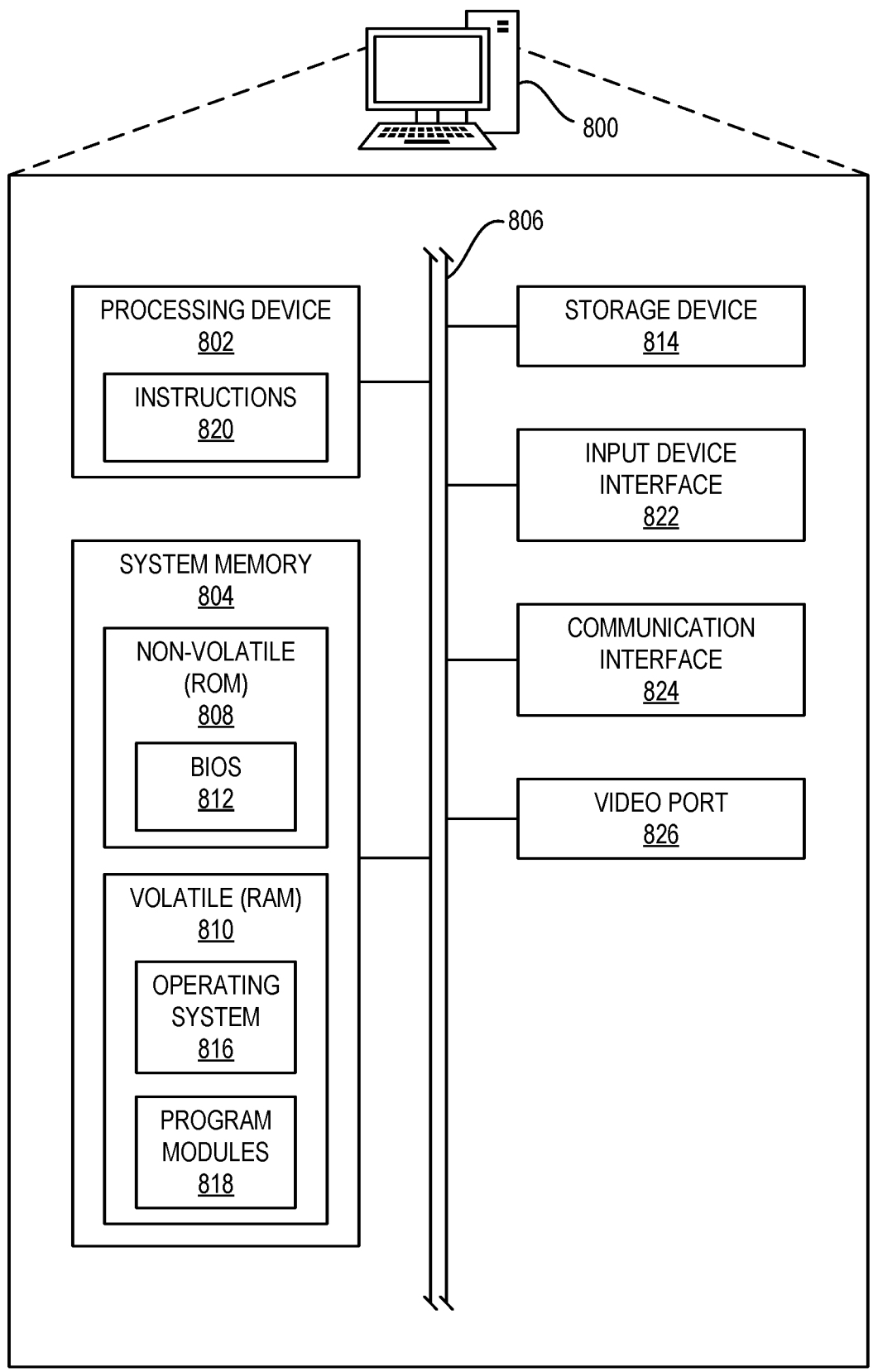
FIG. 8 is a block diagram of a computer system suitable for detecting and measuring impedance mismatch in a system according to embodiments disclosed herein.

FIG. 8 is a block diagram of a computer system 800 suitable for detecting and measuring impedance mismatch in a system according to embodiments disclosed herein. The computer system 800 comprises any computing or electronic device capable of including firmware, hardware, and/or executing software instructions that could be used to perform any of the methods or functions described above. In this regard, the computer system 800 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 800 in this embodiment includes a processing device 802 or processor, a system memory 804, and a system bus 806. The processing device 802 represents one or more commercially available or proprietary general-purpose processing devices, such as a microprocessor, central processing unit (CPU), or the like. More particularly, the processing device 802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 802 is configured to execute processing logic instructions for performing the operations and steps discussed herein.

In this regard, the various illustrative logical blocks, modules, and circuits described in connection with the embodiments disclosed herein may be implemented or performed with the processing device 802, which may be a microprocessor, FPGA, a DSP, an application-specific integrated circuit (ASIC), or other programmable logic device, a discrete gate or transistor logic, discrete hardware components, or any combination thereof designed to perform the functions described herein. Furthermore, the processing device 802 may be a microprocessor, or may be any conventional processor, controller, microcontroller, or state machine. The processing device 802 may also be implemented as a combination of computing devices (e.g., a combination of a DSP and a microprocessor, a plurality of microprocessors, one or more microprocessors in conjunction with a DSP core, or any other such configuration).

The system memory 804 may include non-volatile memory 808 and volatile memory 810. The non-volatile memory 808 may include read-only memory (ROM), erasable programmable read-only memory (EPROM), electrically erasable programmable read-only memory (EEPROM), and the like. The volatile memory 810 generally includes random-access memory (RAM) (e.g., dynamic random access memory (DRAM), such as synchronous DRAM (SDRAM)). A basic input/output system (BIOS) 812 may be stored in the non-volatile memory 808 and can include the basic routines that help to transfer information between elements within the computer system 800.

The system bus 806 provides an interface for system components including, but not limited to, the system memory 804 and the processing device 802. The system bus 806 may be any of several types of bus structures that may further interconnect to a memory bus (with or without a memory controller), a peripheral bus, and/or a local bus using any of a variety of commercially available bus architectures.

The computer system 800 may further include or be coupled to a non-transitory computer-readable storage medium, such as a storage device 814, which may represent an internal or external hard disk drive (HDD), flash memory, or the like. The storage device 814 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 816 and any number of program modules 818 or other applications can be stored in the volatile memory 810, wherein the program modules 818 represent a wide array of computer-executable instructions corresponding to programs, applications, functions, and the like that may implement the functionality described herein in whole or in part, such as through instructions 820 on the processing device 802. The program modules 818 may also reside on the storage mechanism provided by the storage device 814. As such, all or a portion of the functionality described herein may be implemented as a computer program product stored on a transitory or non-transitory computer-usable or computer-readable storage medium, such as the storage device 814, volatile memory 810, non-volatile memory 808, instructions 820, and the like. The computer program product includes complex programming instructions, such as complex computer-readable program code, to cause the processing device 802 to carry out the steps necessary to implement the functions described herein.

An operator, such as the user, may also be able to enter one or more configuration commands to the computer system 800 through a keyboard, a pointing device such as a mouse, or a touch-sensitive surface, such as the display device, via an input device interface 822 or remotely through a web interface, terminal program, or the like via a communication interface 824. The communication interface 824 may be wired or wireless and facilitate communications with any number of devices via a communications network in a direct or indirect fashion. An output device, such as a display device, can be coupled to the system bus 806 and driven by a video port 826. Additional inputs and outputs to the computer system 800 may be provided through the system bus 806 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for measuring impedance mismatch in a system, the method comprising:
   injecting a first test signal from a first test source circuit into a forward path through the system;
   measuring electrical parameters of the system from the first test signal to produce a first set of measurements;
   injecting a second test signal from a second test source circuit, different than the first test circuit, into a reverse path through the system;
   measuring electrical parameters of the system from the second test signal to produce a second set of measurements; and
   calculating, by a mismatch detector, an impedance mismatch of the system based on the first set of measurements and the second set of measurements,
   wherein the mismatch detector is coupled to a radio frequency (RF) transmission line and wherein the plurality of power detectors are spaced apart at segmented portions of λ along the RF transmission line, where λ is a wavelength of an operating frequency of the RF transmission line.

2. The method of claim 1, wherein the system comprises a radio frequency (RF) circuit.

3. The method of claim 2, wherein:
   injecting the first test signal into the forward path through the system comprises injecting the first test signal into a first port of the RF circuit; and
   injecting the second test signal into the reverse path through the system comprises injecting the second test signal into a second port of the RF circuit.

4. The method of claim 1, wherein the forward path comprises a built-in self-test (BIST) structure having repeating unit cells.

5. The method of claim 4, wherein measuring the electrical parameters of the system comprises measuring one or more of the electrical parameters at each of the repeating unit cells.

6. The method of claim 5, wherein measuring the electrical parameters of the system further comprises measuring voltage at each of the repeating unit cells using a corresponding power detector.

7. The method of claim 1, wherein calculating the impedance mismatch of the system comprises using a non-linear solver to calculate phases of the first set of measurements and the second set of measurements.

8. A mismatch detector, comprising:
   a first switching element coupled between a signal source and a forward injection node that is configured to inject a first test signal from a first test source circuit;
   a second switching element coupled between the signal source and a reverse injection node that is configured to inject a second test signal from a second test source circuit;
   a plurality of power detectors coupled between the forward injection node and the reverse injection node; and
   a processor coupled to the plurality of power detectors and configured to calculate an impedance mismatch between the forward injection node and the reverse injection node based on measurements of the plurality of power detectors,
   wherein the mismatch detector is coupled to a radio frequency (RF) transmission line and wherein the plurality of power detectors are spaced apart at segmented portions of λ along the RF transmission line, where λ is a wavelength of an operating frequency of the RF transmission line.

9. The mismatch detector of claim 8, wherein the plurality of power detectors are positioned along the RF transmission line at λ/8 distances within a 20% tolerance.

10. The mismatch detector of claim 8, wherein the processor is configured to implement a non-linear solver.

11. The mismatch detector of claim 8, wherein the mismatch detector is configured to couple to a millimeter wave (mmWave) or higher frequency circuit and the mismatch detector is implemented as a system on chip (SoC).

12. A system, comprising:
    a circuit; and
    a built-in self-test (BIST) structure coupled to the circuit and configured to:
    inject a first test signal from a first test source circuit into a forward path through the circuit;
    measure electrical parameters of the system from the first test signal to produce a first set of measurements;
    inject a second test signal from a second test source circuit into a reverse path through the circuit;
    measure electrical parameters of the system from the second test signal to produce a second set of measurements; and
    calculate an impedance mismatch of the system based on the first set of measurements and the second set of measurements,
    wherein the BIST structure is coupled to a radio frequency (RF) transmission line and wherein the plurality of power detectors are spaced apart at segmented portions of λ along the RF transmission line, where λ is a wavelength of an operating frequency of the RF transmission line.

13. The system of claim 12, wherein the circuit is a linearized circuit comprising non-linear components.

14. The system of claim 12, wherein the circuit is a linear circuit.

15. The method of claim 12, wherein the BIST comprises a transmission line connected between an amplifier and an antenna.

16. The method of claim 15, wherein the transmission line is connected between a power amplifier and the antenna.

17. The method of claim 15, wherein the transmission line is connected between a low noise amplifier and the antenna.

18. The method of claim 15, wherein the transmission line is connected between a power amplifier and the antenna and between a low noise amplifier and the antenna.

* * * * *